(12) United States Patent
Roux

(10) Patent No.: US 7,549,038 B1
(45) Date of Patent: *Jun. 16, 2009

(54) METHOD AND SYSTEM FOR DETERMINING MEMORY CHUNK LOCATION USING CHUNK HEADER INFORMATION

(75) Inventor: Alexandre Roux, Sunnyvale, CA (US)

(73) Assignee: PALM, Inc., Sunnyvale, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 11/072,766

(22) Filed: Mar. 3, 2005

Related U.S. Application Data

(63) Continuation of application No. 10/261,881, filed on Sep. 30, 2002, now Pat. No. 6,880,065.

(51) Int. Cl.
*G06F 12/00* (2006.01)
(52) U.S. Cl. ..................... 711/220; 711/170
(58) Field of Classification Search .......... 711/170, 711/220
See application file for complete search history.

(56) References Cited

U.S. PATENT DOCUMENTS

| | | | |
|---|---|---|---|
| 4,796,177 A | 1/1989 | Nishimura et al. | |
| 5,249,280 A | 9/1993 | Nash et al. | |
| 5,357,620 A * | 10/1994 | Suzuki | 711/220 |
| 5,420,992 A | 5/1995 | Killian et al. | |
| 5,680,568 A * | 10/1997 | Sakamura | 711/220 |
| 5,732,404 A | 3/1998 | Johnson et al. | |
| 6,880,065 B1 * | 4/2005 | Roux | 711/220 |

OTHER PUBLICATIONS

Andrew S. Tannenbaum. "Structured Computer Organization". (C) 1976 Prentice Hall, Inc. pp. 253-254.*

* cited by examiner

*Primary Examiner*—Kevin L Ellis
*Assistant Examiner*—Jared I Rutz

(57) ABSTRACT

A computer system memory is structured as contiguous memory chunks, each chunk having a header. A chunk header includes a first offset value, a sign bit associated with the first offset value, and a number of bits having values that are added to a second offset value that is determined from the first offset value. In particular, the actual offset value can be determined by adding the values of the bits to the second offset value and by multiplying the result by the binary equivalent of four. The second offset value is then used for determining an actual offset value that is applied to a base address to provide a memory location of the memory chunk.

21 Claims, 12 Drawing Sheets

SIGN BIT

| | ACTUAL OFFSET VALUE | | | | |
|---|---|---|---|---|---|
| | 1st OFFSET VALUE (e.g., 23 BITS) | B0 | B1 | 0 | 0 |
| | | 2nd OFFSET VALUE | | | |

METHOD AND SYSTEM FOR DETERMINING MEMORY CHUNK LOCATION USING CHUNK HEADER INFORMATION

RELATED UNITED STATES PATENT APPLICATION

This application is a continuation of the commonly-owned U.S. patent application Ser. No. 10/261,881 by A. Roux, filed on Sep. 30, 2002, entitled "Memory Management Method and System Thereof," now U.S. Pat. No. 6,880,065, assigned to the assignee of the present invention, and hereby incorporated by reference in its entirety.

BACKGROUND OF THE INVENTION

1. Field of the Invention

The present invention relates generally to computer system memories. Specifically, the present invention relates to a memory manager implemented on a hand-held device.

2. Related Art

Generally speaking, in one implementation of a memory architecture on a hand-held device (commonly referred to as personal digital assistants or PDAs), the memory is divided into one or more "heaps." A heap is a contiguous area of memory that includes multiple "chunks." A chunk is an area of contiguous memory within a heap. When applications work with memory, they usually work with chunks of memory. A memory manager executed by the device's operating system manages each heap independently, allocating chunks to requesting applications, keeping track of the locations of chunks, and rearranging chunks as necessary to defragment heaps and merge free space.

In one prior art implementation, a chunk is aligned on word boundaries; that is, the starting point of a chunk is aligned with the starting point of a region of memory that is two bytes in length. In another prior art implementation, a chunk is aligned with a region of memory that is four bytes in length. Note that a chunk may include multiples of such regions.

Each chunk in memory is located using a reference that may be known as a local identifier (local ID). When the memory manager allocates a chunk, it generates and stores a pointer to the chunk. The reference or local ID is the offset of the pointer from the base address of the memory module on which the chunks reside. The memory module may be a physical component of the computer system, or it may be a convenient logical construct of the computer system's memory.

Associated with each chunk is a chunk header. A chunk header generally has the following structure:

```
typedef struct
{
    UInt32   size       :24;   // actual size of chunk
    UInt32   sizeAdj    :4;    // size adjustment
    UInt32   unused3    :1;    // unused
    UInt32   unused2    :1;    // unused
    UInt32   moved      :1;    // used by MemHeapScramble
    UInt32   free       :1;    // set if free chunk
    Int32    hOffset    :24;   // signed MemHandle offset/2
                               // used in free chunks to point to
                               // next free chunk
    UInt32   owner      :4;    // owner ID
    UInt32   lockCount  :4;    // lock count
} MemChunkHeaderType;
```

Some of the elements listed above are particularly relevant to this discussion and so are further described below; the remaining elements are known in the art and thus are not described further.

The "size" element (or field) is 24 bits in length and describes the size of the chunk associated with the header. This size is larger than the chunk size requested by an application because it includes the size of the header as well as the size of the chunk itself.

The "sizeAdj" field is four bits in length and is used to calculate the requested size of the chunk given the actual size provided by the size field.

The hOffset field is 24 bits in length. For a free (unused) chunk, the value of hOffset provides the distance to the next free chunk. For an allocated (used) chunk, the value of hOffset provides the distance between the pointer and the base address, divided by the binary equivalent of two. Because a chunk is aligned at least to a word boundary as mentioned above, the least significant bit of the actual offset is always zero. By dividing the actual offset value by a binary two, the least significant bit is in effect truncated.

One of the 24 bits in the hOffset field is a sign bit, because the offset can be a negative value (if the base address is higher than the actual address of the chunk, for example). To determine the actual offset from the value provided by hOffset, the bits in the hOffset field are multiplied by a binary two, yielding a 24-bit address ending with a bit value of zero, plus the sign bit. The sign bit identifies which direction to move within the heap. In this manner, 23 bits (24 bits minus the sign bit) can be used to address a memory range of up to 16 megabytes (MB), moving in either direction within the memory (±16 MB).

While 16 MB of memory may be adequate for many applications, a desire to increase memory capacity remains. The increase in the number and complexity of software applications is one factor in the drive for larger memories. Other motivating factors include consumer preferences and competitive pressures.

Hardware improvements allow memories with larger capacities to be used in smaller form factor devices such as hand-held computer systems. Hardware improvements include the use of Advanced RISC (reduced instruction set computer) Microprocessors (ARMs) as well as the development of higher density memory devices. Memory capacities of up to 128 MB can be introduced into hand-held computer systems. However, the prior art is problematic because only 16 MB of memory can be addressed.

Accordingly, an addressing system and/or method that can support larger memories, in particular memories up to 128 MB in size, is desirable. One issue to consider is the impact on the operating system(s) currently in use; it is desirable to minimize the impact on existing software tools. Another issue to consider is compatibility with applications in use, particularly third-party applications; it is desirable to maintain compatibility with those applications. The present invention provides a novel solution that can satisfy these desires.

SUMMARY OF THE INVENTION

Embodiments of the present invention pertain to a method and system thereof for managing a computer system memory, where the memory is structured as contiguous memory chunks, each chunk having a header. In one embodiment, a chunk header includes a first offset value, a sign bit associated with the first offset value, and a number of bits having values that are added to a second offset value that is determined from the first offset value. The second offset value is then used for determining an actual offset value that is applied to a base address to provide a memory location of the memory chunk. In one such embodiment, the first offset value includes 23 bits (plus the sign bit), the number of bits added to the second offset value is two, and the actual offset value includes 27 bits (plus the sign bit). As such, up to 128 MB of memory can be addressed.

In one embodiment, the first offset value is multiplied by the binary equivalent of four to determine the second offset value. In another embodiment, the second offset value is determined by appending two lower order bits to the least significant bit of the first offset value, the two lower order bits having fixed values of zero.

In one embodiment, the actual offset value is determined by adding the values of the bits to the second offset value and by multiplying the result by the binary equivalent of four. In such an embodiment, the memory chunk is aligned to a boundary of a region of the memory, wherein the region is four bytes in length.

In other embodiments, the chunk header also includes a size field having a size value for the memory chunk including the chunk header, and a size adjustment field having a size adjustment value that is applied to the size value. In yet another embodiment, the first offset value and the number of bits that are to be added to the second offset value are contiguous within the chunk header.

In summary, according to the various embodiments of the present invention, larger memories—in particular memories up to 128 MB in size—can be supported. The memory management method and system of the present invention accomplish this within the framework of existing software tools while maintaining compatibility with third-party applications that may be in use. The changes made to the chunk header according to the various embodiments of the present invention are transparent to those applications that do not directly access the chunk header. These and other objects and advantages of the present invention will be recognized by one skilled in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "adding" or "multiplying" or "appending" or "receiving" or "determining" or "generating" or "storing" or "truncating" or "subtracting" or "dividing" or the like, refer to the action and processes of a computer system (e.g., flowcharts 500 and 700 of FIGS. 5 and 7, respectively), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
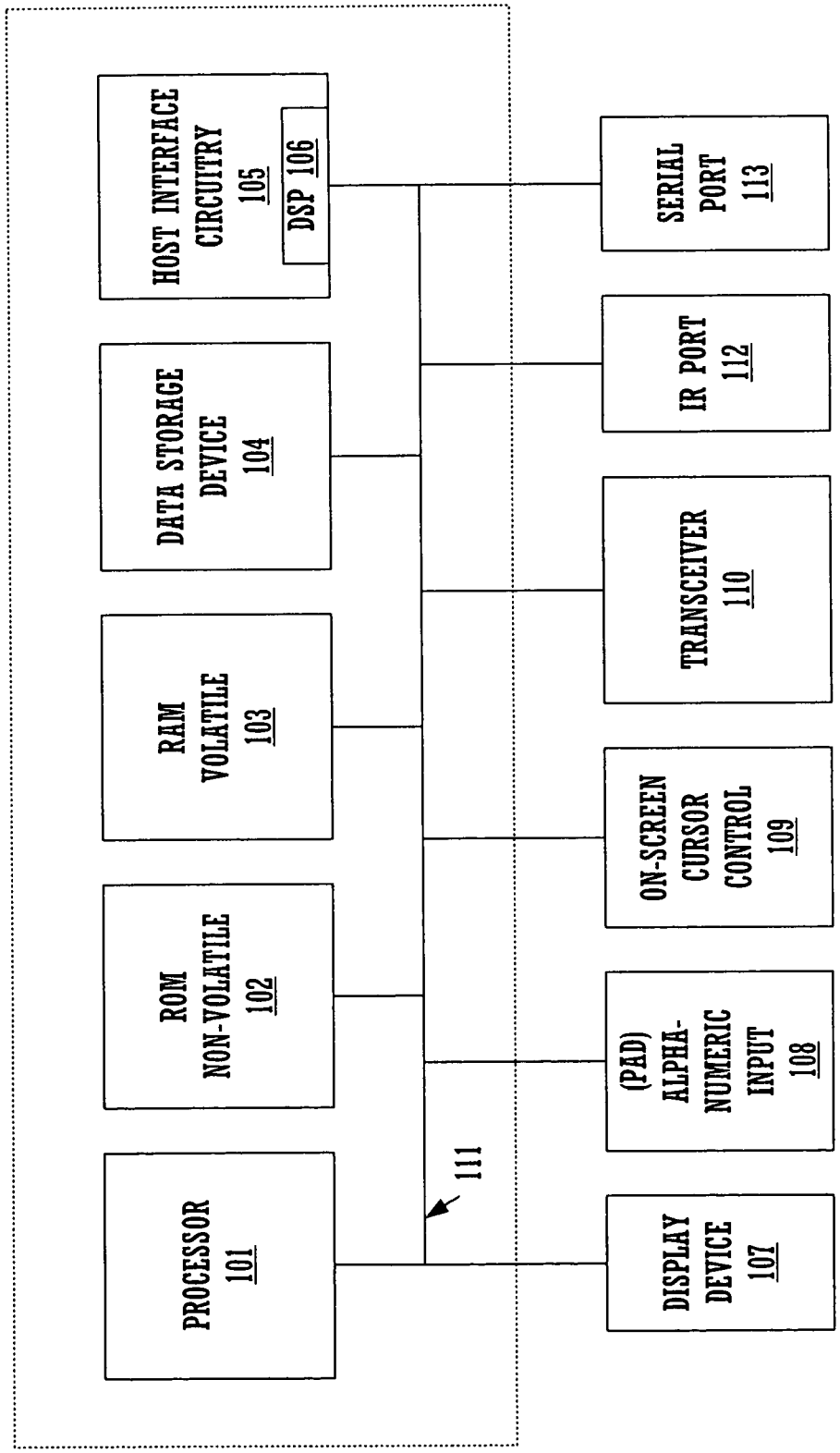
FIG. 1 is a block diagram of an exemplary hand-held computer system upon which embodiments of the present invention may be practiced.

FIG. 1 is a block diagram of one embodiment of a device 100 upon which embodiments of the present invention may be implemented. In one embodiment, device 100 is a hand-held computer system often referred to as a personal digital assistant (PDA) or a portable information device (PID). In its various implementations, device 100 may not include all of the elements illustrated by FIG. 1, or device 100 may include other elements not described by FIG. 1.

In one embodiment, device 100 includes an address/data bus 111 for communicating information, a central processor 101 coupled with the bus 111 for processing information and instructions, a volatile memory 103 (e.g., random access memory, RAM) coupled with the bus 111 for storing information and instructions for the central processor 101, and a non-volatile memory 102 (e.g., read only memory, ROM) coupled with the bus 111 for storing static information and instructions for the processor 101. Types of processors used in hand-held computer systems include the Advanced RISC (reduced instruction set computer) Microprocessor (ARM), the HITACHI HC11 processor, the TRANSMETA Clipper Chip, INTEL Mobile chip sets, and 68000-based chip sets. An ARM, in particular, provides the capability to support 128 MB of memory.

In the present embodiment, device 100 also includes an optional data storage device 104 (e.g., a Secure Digital card, a Multi Media Card, or the like) coupled with the bus 111 for storing information and instructions. Device 104 can be removable. In one embodiment, device 100 also contains a display device 107 coupled to the bus 111 for displaying information to a user.

In the present embodiment, device 100 also includes a signal transmitter/receiver (transceiver) device 110, which is coupled to bus 111 for providing a wireless radio (RF) communication link between device 100 and other wireless devices. Transceiver 110 may be coupled to device 100 or integral with device 100.

In one embodiment, device 100 includes host interface circuitry 105 coupled to bus 111. Host interface circuitry 105 includes an optional digital signal processor (DSP) 106 for processing data to be transmitted or data that are received via transceiver 110. Alternatively, processor 101 can perform some or all of the functions performed by DSP 106. In one embodiment, host interface circuitry 105 comprises a universal asynchronous receiver-transmitter (UART) module that provides the receiving and transmitting circuits utilized for serial communication for both the infrared port 112 and the serial port 113.

In one embodiment, device 100 also includes an optional alphanumeric input device 108 that, in one implementation, is a handwriting recognition pad ("digitizer"). Alphanumeric input device 108 can communicate information and command selections to processor 101 via bus 111. In one embodiment, device 100 also includes an optional cursor control or directing device (on-screen cursor control 109) coupled to bus 111 for communicating user input information and command selections to processor 101. In one implementation, on-screen cursor control device 109 is a touch screen device incorporated with display device 107.

In one embodiment, each of the memories of device 100 (e.g., RAM 103, ROM 102, etc.) is divided into one or more heaps that are further divided into one or more chunks. Device 100 executes an operating system that implements what can be generally referred to as a memory manager. The memory manager functions at least to maintain the location and size of each memory chunk in nonvolatile and nonvolatile memories.

Figure 2:
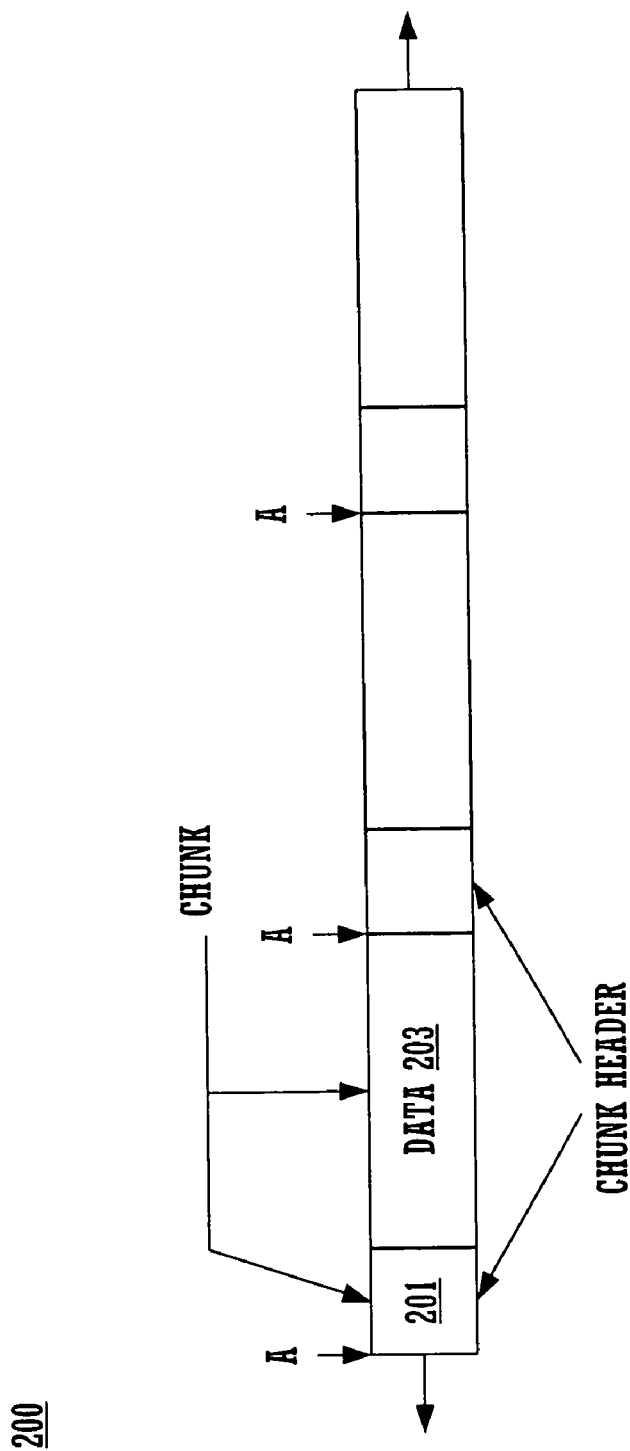
FIG. 2 illustrates a memory heap including memory chunks according to one embodiment of the present invention.

FIG. 2 illustrates a memory heap 200 including memory chunks (exemplified by chunk 202) according to one embodiment of the present invention. Each chunk 202 includes a chunk header 201. Each chunk 202 begins with a header 201, followed by data 203 held by the chunk. Chunks of memory may be allocated (used) or unallocated (free, or unused).

In one embodiment, each chunk 202 is aligned to a boundary A of the heap 200. In one such embodiment, the boundary A corresponds to a four-byte region of memory. It is understood that a chunk may include multiples of such regions. That is, for example, although a chunk may be aligned with the boundary of one four-byte region, the chunk may include more than four bytes. In one embodiment, a limitation is applied to the maximum size of memory that can be allocated by an application. In one such embodiment, an allocated chunk is limited to 16 MB.

Figure 3:
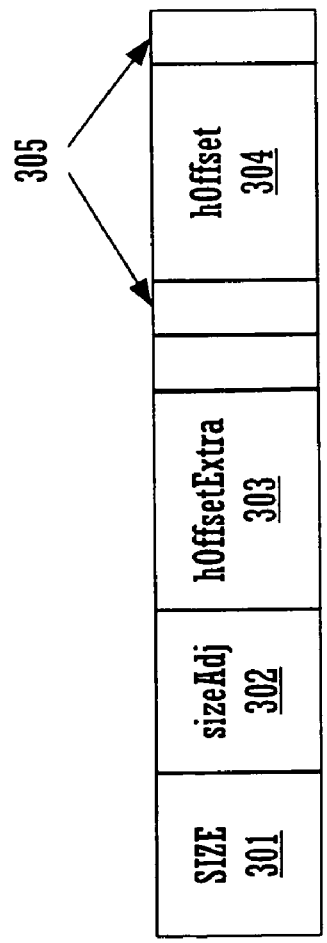
FIG. 3 illustrates a chunk header for an allocated memory chunk according to one embodiment of the present invention.

FIG. 3 illustrates a chunk header 201a for an allocated (used) memory chunk according to one embodiment of the present invention. In the present embodiment, chunk header 201a includes a size field 301, a sizeAdj field 302, an hOffsetExtra field 303, and an hOffset field 304. The chunk header 201a can also include other fields 305 that may be used by the operating system (memory manager) of device 100 (FIG. 1). According to one embodiment, a chunk header 201a has the following structure:

```
typedef struct
{
    UInt32    size           :24;    // actual size of chunk
    UInt32    sizeAdj        :4;     // size adjustment
    UInt32    hOffsetExtra   :2;     // shift hOffset by 2
                                     // and add this bit value
    UInt32    moved          :1;     // used by MemHeapScramble
    UInt32    free           :1;     // set if free chunk
    Int32     hOffset        :24;    // signed MemHandle offset/4
    UInt32    owner          :4;     // owner ID
    UInt32    lockCount      :4;     // lock count
} MemChunkHeaderType;
```

With reference to FIG. 3, the fields of chunk header 201a are referred to using the names by which they are commonly known in the art (e.g., sizeAdj, hOffset, etc.). The use of such names facilitates compatibility with existing software tools and third-party applications that may be in use. The changes made to the chunk header 201a according to the various embodiments of the present invention are transparent to those applications that do not directly access the chunk header. It is appreciated that the fields in chunk header 201a may be known by other names. Some software tools and applications may use different names, or they may be modified to accommodate new names.

In one embodiment, the fields within chunk header 201a are situated in the particular order illustrated by FIG. 3. Such ordering facilitates compatibility with existing software tools and third-party applications that may be in use. However, some software tools and applications may use a different order, or they may be modified to accommodate a new order. Accordingly, it is appreciated that the order of these fields within the chunk header 201a may be different than that illustrated by FIG. 3. In one embodiment, the hOffset field 304 and the hOffsetExtra field 303 are contiguous.

In the present embodiment, the size field 301 is 24 bits in length and describes the size of the chunk 202 (FIG. 2) associated with the header 201a. This size is typically larger than the chunk size requested by an application because it includes the size of the header 201a as well as the size of the chunk itself. In the present embodiment, the sizeAdj field 302 is four bits in length and is used to calculate the requested size of the chunk given the actual size provided by the size field 301.

According to the present embodiment of the present invention, referring to FIG. 3, the hOffsetExtra field 303 is two bits in length and the hOffset field 304 is 24 bits in length. In one embodiment, one of the bits in the hOffset field 304 is a sign bit (indicating positive or negative). The sign bit identifies which direction to move within the heap 200 (FIG. 2). The manner in which the information in these fields may be used is described below in conjunction with FIG. 5.

Figure 4:
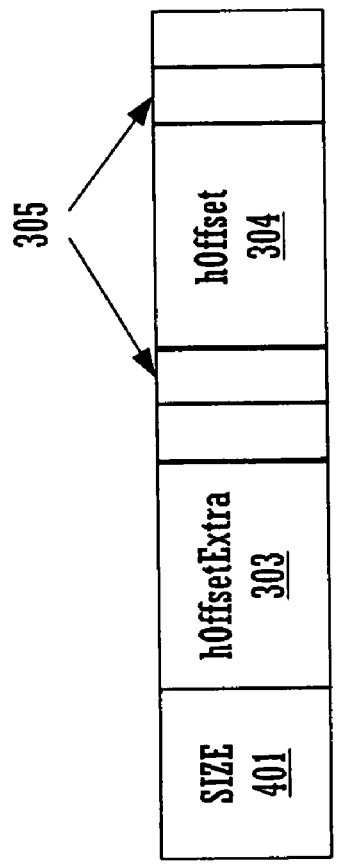
FIG. 4 illustrates a chunk header for an unallocated memory chunk according to one embodiment of the present invention.

FIG. 4 illustrates a chunk header 201b for an unallocated memory chunk according to one embodiment of the present invention. In the present embodiment, chunk header 201b includes a size field 401, an hOffsetExtra field 303, and an hOffset field 304. The chunk header 201b can also include other fields 305 that may be used by the operating system (memory manager) of device 100 (FIG. 1). According to one embodiment, a chunk header 201b has the following structure:

```
typedef struct
{
    UInt32      size            :28;    // actual size of chunk
    UInt32      hOffsetExtra    :2;     // (offset/4)
    UInt32      moved           :1;     // used by MemHeapScramble
    UInt32      free            :1;     // set if free chunk
    Int32       hOffset         :24;    // signed MemHandle offset/16
                                        // (add the hOffset extra)
                                        // used in free chunks to
                                        // point to next free chunk
    UInt32      owner           :4;     // owner ID
    UInt32      lockCount       :4;     // lock count
} MemChunkHeaderType;
```

With reference to FIG. 4, as mentioned above, the fields of chunk header 201b are referred to using the names by which they are commonly known in the art; however, these fields may be known by other names. Also, it is appreciated that the order of these fields within the chunk header 201a may be different than that illustrated by FIG. 4.

In the present embodiment, the size field 401 is 28 bits in length and describes the size of the chunk 202 (FIG. 2) associated with the header 201b. In comparison to header 201a of FIG. 3, the size field 401 of header 201b encompasses more bits, and header 201b does not include a sizeAdj field. Instead, for free chunks, the four bits of the sizeAdj field are used to increase the size field to 28 bits in length. In the present embodiment, the size of free memory chunks is not subject to the limitation that is applied to the size of allocated chunks according to one embodiment of the present invention. The size field 410 of header 201b can be used to describe a maximum free chunk size of up to 256 MB.

According to the present embodiment of the present invention, referring to FIG. 4, the hOffsetExtra field 303 is two bits in length and the hOffset field 34 is 24 bits in length. In one embodiment, one of the bits in the hOffset field 304 is a sign bit (indicating positive or negative). The manner in which the information in these fields may be used is described below in conjunction with FIG. 5.

Figure 5:
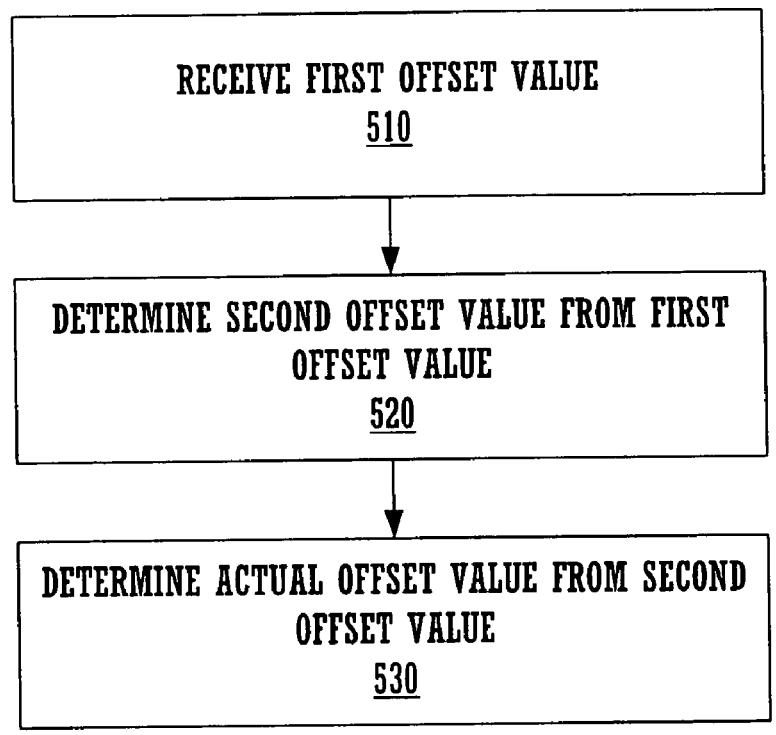
FIG. 5 is a flowchart of one embodiment of a method for generating an offset value from information in a chunk header in accordance with the present invention.

FIG. 5 is a flowchart 500 of one embodiment of a method for generating an offset value from information in a chunk header in accordance with the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. In the various embodiments of the present invention, flowchart 500 can be implemented by device 100 (FIG. 1) as computer-readable program instructions stored in a memory unit (e.g., ROM 102, RAM 103 or data storage device 104 of FIG. 1) and executed by a processor (e.g., processor 101 of FIG. 1).

Figure 6A:
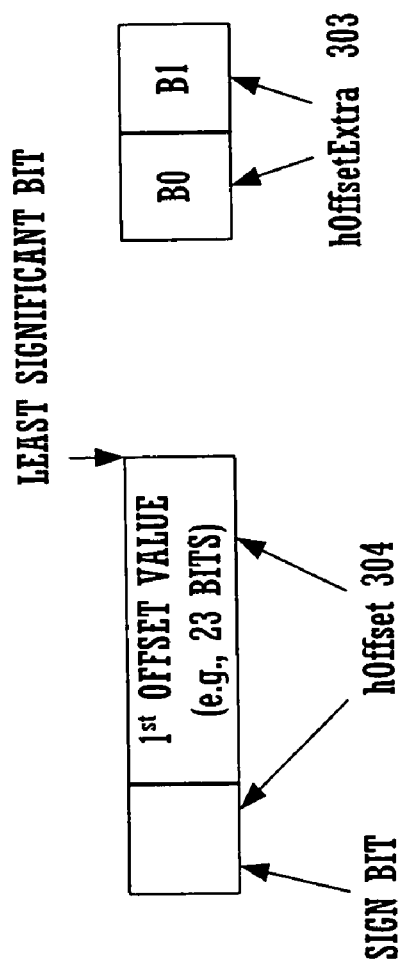
FIGS. 6A, 6B and 6C illustrate the generation of an offset value from information in a chunk header according to one embodiment of the present invention.
Figure 6B:
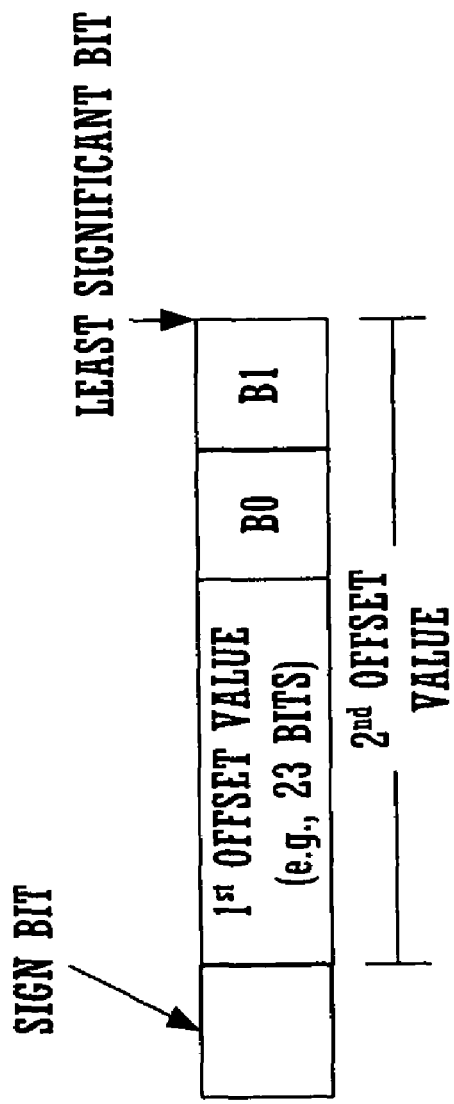
Figure 6C:
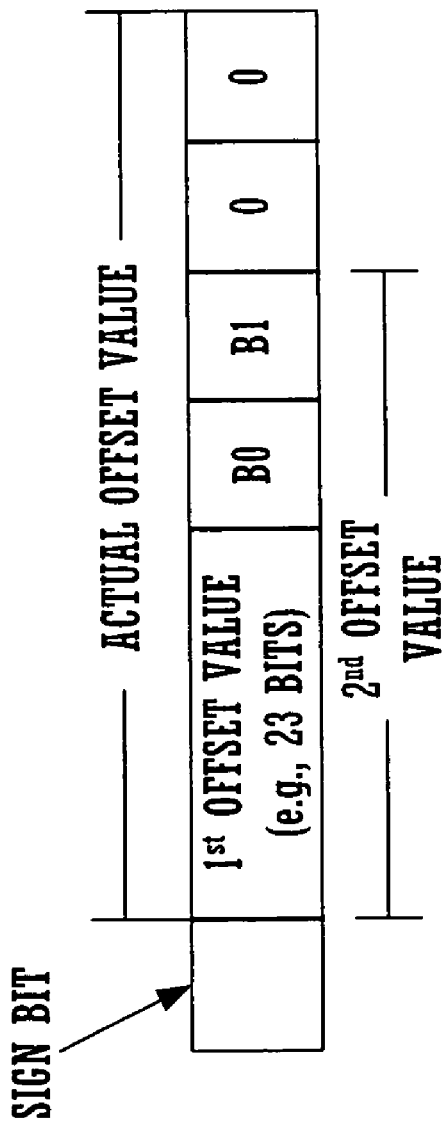

Flowchart 500 of FIG. 5 is described in conjunction with FIGS. 6A, 6B and 6C. In step 510 of FIG. 5, referring also to FIG. 6A, a first offset value is received (e.g., read) from chunk header 201, specifically from hOffset field 304. In one embodiment, hOffset field 304 includes 24 bits, including a sign bit. In one such embodiment, the first offset value is 23 bits in length.

According to the present embodiment of the present invention, chunk header 201 also includes an hOffsetExtra field 303, which includes some number of bits. In one embodiment, hOffsetExtra field 303 includes two bits, B0 and B1. The bits B0 and B1 can each have a value of zero or one.

In step 520 of FIG. 5, with reference also to FIG. 6B, a second offset value is determined from the first offset value. In one embodiment, the second offset value consists of the sign bit from hOffset field 304, the first offset value from hOffset field 304, and the number of bits in hOffset field 303. In one embodiment, the second offset value is 25 bits in length, plus a sign bit.

The second offset value can be determined in a number of different ways. In one embodiment, the second offset value is obtained by multiplying the first offset value by the binary equivalent of four (100). This will yield a 25-bit value with its two lowest order bits equal to zero. The bit values B0 and B1 are then added to the 25-bit value to yield the second offset value. In another embodiment, the bits in hOffset field 303 are appended to (concatenated with) the least significant bit of the first offset value. According to one embodiment, the computation of an offset is given by:

define    PrvChunkOffset(chunkP)\(((chunkP)→hOffset<<2)|((chunkP)→hOffsetExtra))

In step 530 of FIG. 5, with reference also to FIG. 6C, the actual offset value (from the chunk or chunk header to a base address) is determined from the second offset value. In one embodiment, the actual offset value is obtained by multiplying the second offset value by the binary equivalent of four. In another embodiment, the actual offset value is obtained by appending (concatenating) two lower order bits, each having a value of zero, to the least significant bit of the second offset value. In either of these embodiments, the actual offset value is 27 bits in length, plus a sign bit. Accordingly, a memory range of up to ±128 MB can be addressed.

In the present embodiment, the two lower order bits of the actual offset value are equal to zero. As mentioned above, in one embodiment, memory chunks are aligned with a boundary of a region of the memory heap, where the region is four bytes in length. This can be accomplished by having the two lower order bits of the actual offset value set to zero.

Thus, according to the embodiments of the present invention, larger memories—in particular memories up to 128 MB in size—can be supported. The memory management method and system of the present invention accomplish this within the framework of existing software tools while maintaining compatibility with third-party applications that may be in use. In comparison to conventional (prior art) methods, the size of the header chunk is not increased, but the memory capacity that can be supported is increased from 16 MB to 128 MB.

Figure 7:
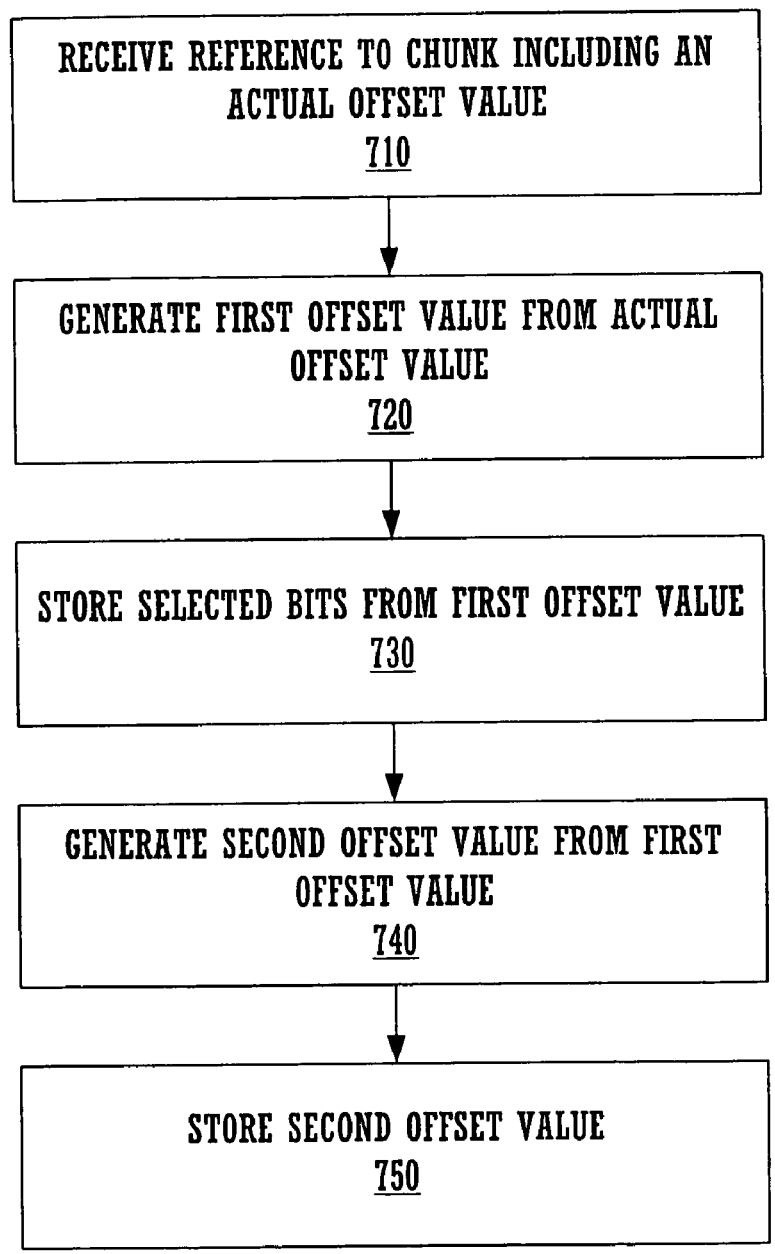
FIG. 7 is a flowchart of one embodiment of a method for generating information in a chunk header from an offset value in accordance with the present invention.

FIG. 7 is a flowchart 700 of one embodiment of a method for generating information in a chunk header from an offset value in accordance with the present invention. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed. In the various embodiments of the present invention, flowchart 700 can be implemented by device 100 (FIG. 1) as computer-readable program instructions stored in a memory unit (e.g., ROM 102, RAM 103 or data storage device 104 of FIG. 1) and executed by a processor (e.g., processor 101 of FIG. 1).

Figure 8A:
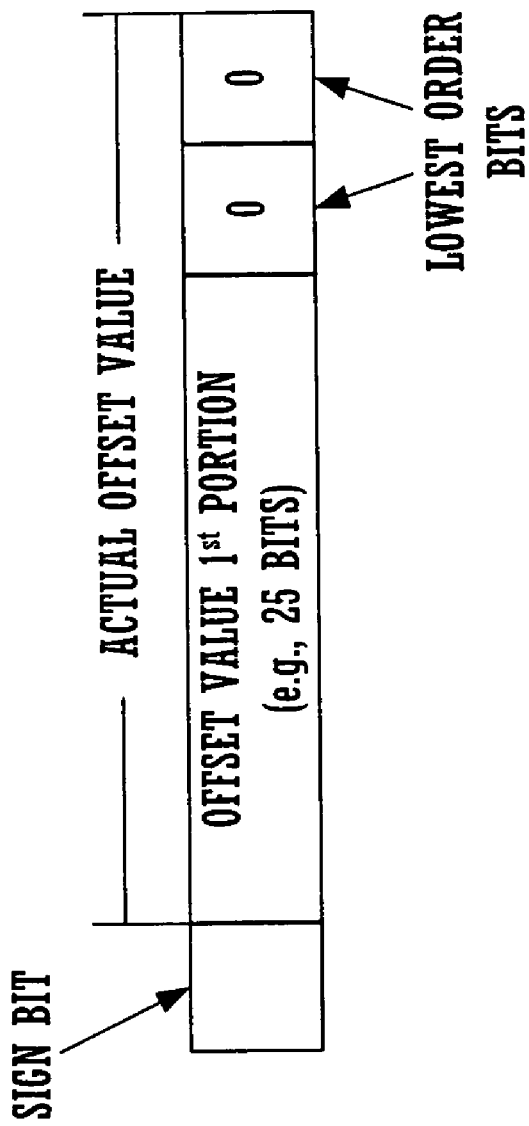
FIGS. 8A, 8B and 8C illustrate the generation of information in a chunk header from an offset value according to one embodiment of the present invention.
Figure 8B:
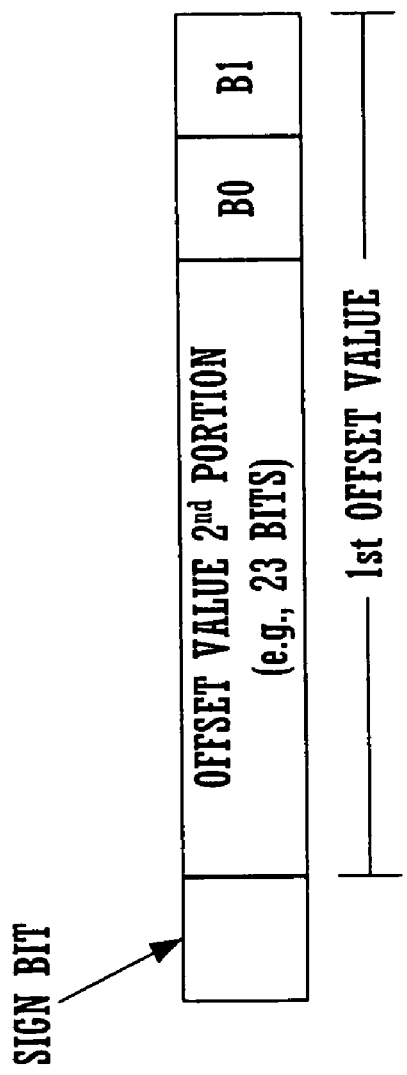
Figure 8C:
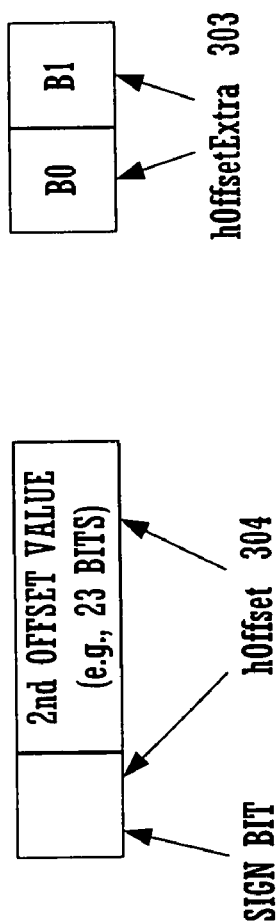

Flowchart 700 of FIG. 7 is described in conjunction with FIGS. 8A, 8B and 8C. In step 710 of FIG. 7, with reference also to FIG. 8A, a reference to a memory chunk (e.g., an actual offset value) is received. In the present embodiment, the actual offset value is 27 bits in length plus a sign bit, corresponding to a memory range of ±128 MB. In one embodiment, memory chunks are aligned with a boundary of a region of the memory heap, where the region is four bytes in length. Accordingly, the lowest order bits of the actual offset value will be equal to zero. Thus, in the present embodiment, the actual offset value includes a first portion that is 25 bits in length plus two lower order bits set to zero.

In step 720 of FIG. 7, referring also to FIG. 8B, a first offset value is generated from the actual offset value. In one embodiment, the first offset value includes the first portion of bits from the actual offset value. That is, in the present embodiment, the two lowest order bits are in effect removed, while the first portion of 25 bits and the sign bit are retained. The first offset value will therefore include fewer bits than the actual offset value.

The first offset value can be determined from the actual offset value in a number of different ways. In one embodiment, the actual offset value is divided by the binary equivalent of four (100). In another embodiment, the two lowest order bits are truncated from the actual offset value.

In the present embodiment, in addition to the sign bit, the 25 bits of the first offset value will include a portion of bits that is 23 bits in length, and two lower order bits B0 and B1. The bits B0 and B1 can each have a value of zero or one. For simplicity of reference, the 23-bit portion of bits in the first offset value is referred to below as the second portion of the first offset value.

In step 730, with reference still to FIGS. 7 and 8B, the values of the bits B0 and B1 are stored in memory. In one embodiment, the values of the bits B0 and B1 are stored in the hOffsetExtra field 303 of the chunk header 201a or 201b (FIGS. 3 and 4, respectively).

In step 740 of FIG. 7, with reference also to FIG. 8C, a second offset value is generated from the first offset value. In one embodiment, the second offset value includes the second portion of bits (e.g., the 23-bit portion), without the two lowest order bits B0 and B1, plus the sign bit.

The second offset value can be determined in a number of different ways. In one embodiment, the second offset value is generated by truncating the two lowest order bits B0 and B1 from the first offset value. In another embodiment, the second offset value is generated by subtracting the values of the lowest order bits B0 and B1 from the first offset value. This will yield, after the subtracting, a first offset value with its two lowest order bits equal to zero. This result can then be divided by the binary equivalent of four to in effect remove the two lowest order bits and generate the second offset value.

Thus, in one embodiment, a second offset value that is smaller than the first offset value by two bits is generated. In one such embodiment, the second offset value is 23 bits in length, plus the sign bit.

In step 750 of FIG. 7, with reference also to FIG. 8C, the second offset value and the sign bit are stored in the hOffset field 304 of chunk header 201. As mentioned above, the lowest order bits (e.g., B0 and B1) are stored in the hOffsetExtra field 303.

In summary, according to the various embodiments of the present invention, larger memories—in particular memories up to 128 MB in size—can be supported. The memory management method and system of the present invention accomplish this within the framework of existing software tools while maintaining compatibility with third-party applications that may be in use. The changes made to the chunk header according to the various embodiments of the present invention are transparent to those applications that do not directly access the chunk header.

Embodiments of the present invention, memory management method and system thereof, are thus described. While the present invention has been described in particular embodiments, it should be appreciated that the present invention should not be construed as limited by such embodiments, but rather construed according to the below claims.

What is claimed is:

1. A computer system comprising:
    a processor; and
    a memory coupled to said processor, said memory comprising a plurality of contiguous memory chunks, wherein a memory chunk comprises a chunk header comprising:
        a first offset value;
        a sign bit associated with said first offset value; and
        a number of bit values, wherein a second offset value comprising said sign bit and said first offset value and further comprising said bit values as its lowest order bits is used for determining an actual offset value that is applied to a base address to provide a memory location of said memory chunk, wherein said actual offset value is determined by adding said values of said bits to said second offset value and by multiplying the result of said adding by the binary equivalent of four.

2. The computer system of claim 1 wherein said first offset value comprises 23 bits, said number of bit values is two, and said actual offset value comprises 27 bits.

3. The computer system of claim 1 wherein said first offset value is multiplied by the binary equivalent of four to determine said second offset value.

4. The computer system of claim 1 wherein said second offset value is determined by appending two lower order bits to the least significant bit of said first offset value, said two lower order bits having fixed values of zero.

5. The computer system of claim 1 wherein said memory chunk is aligned to a boundary of a region of said memory, wherein said region is four bytes in length.

6. The computer system of claim 1 wherein said chunk header further comprises:
    a size field having a size value for said memory chunk including said chunk header.

7. The computer system of claim 6 wherein said chunk header further comprises:
    a size adjustment field having a size adjustment value that is applied to said size value.

8. The computer system of claim 1 wherein said first offset value and said bit values are contiguous within said chunk header.

9. A method for managing a computer system memory comprising chunks, said method comprising:
    receiving a first offset value having a sign bit;
    accessing a first number of bits in addition to said first offset value;
    determining a second offset value from said first offset value, said second offset value comprising said sign bit and said first offset value and further comprising said first number of bits as its lowest order bits, wherein said second offset value is determined by multiplying said first offset value by the binary equivalent of four and adding bit values for said first number of bits to the result of said multiplying; and
    determining an actual offset value from said second offset value, said actual offset value comprising said second offset value and a second number of additional bits as its lowest order bits, said second number of bits each having a value of zero.

10. The method of claim 9 wherein said first offset value comprises 23 bits, said first number is two, said second number is two, and said actual offset value comprises 27 bits.

11. The method of claim 9 further comprising:
multiplying said second offset value by the binary equivalent of four to determine said actual offset value.

12. The method of claim 9 further comprising:
appending said second number of bits to the least significant bit of said second offset value to determine said actual offset value.

13. The method of claim 9 wherein said chunk is aligned to a boundary of a region of said computer system memory, said region comprising four bytes.

14. The method of claim 9 further comprising:
receiving a size value indicating the size of said chunk including the size of a chunk header associated with said chunk.

15. A method for managing a computer system memory comprising chunks, said method comprising:
receiving a reference to a chunk, said reference comprising an actual offset value between a memory location of said chunk and a base address;
generating a first offset value from said actual offset value, said first offset value having fewer bits than said actual offset value;
storing in a header of said chunk, values of a number of bits selected from said first offset value;
generating a second offset value from said first offset value, said second offset value having fewer bits than said first offset value, wherein the difference in size between said first and second offset values is said number of bits, wherein said second offset value is generated by subtracting said values of said number of bits from said first offset value, and dividing the result of said subtracting by the binary equivalent of four; and
storing in said header, said second offset value.

16. The method of claim 15 wherein said chunk is aligned to a boundary of a region of said computer system memory, said region comprising four bytes.

17. The method of claim 15 wherein said actual offset value comprises 27 bits, said number of bits is two, and said second offset value comprises 23 bits.

18. The method of claim 15 wherein said first offset value is generated by dividing said actual offset value by the binary equivalent of four.

19. The method of claim 15 wherein said first offset value is generated by truncating the two lowest order bits from said actual offset value.

20. The method of claim 15 further comprising:
storing in said header, a sign bit associated with said actual offset value.

21. The method of claim 15 further comprising:
storing in said header, a size value indicating the size of said chunk including said header.

* * * * *